(12) United States Patent
Roberts

(10) Patent No.: US 11,429,695 B2
(45) Date of Patent: Aug. 30, 2022

(54) BARCODE-BASED LICENSE CONFIGURATION FOR AIR-GAPPED SYSTEMS

(71) Applicant: Johnson Controls Tyco IP Holdings LLP, Milwaukee, WI (US)

(72) Inventor: Matthew Joseph Roberts, North Chelmsford, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 225 days.

(21) Appl. No.: 16/855,740

(22) Filed: Apr. 22, 2020

(65) Prior Publication Data

US 2021/0334341 A1 Oct. 28, 2021

(51) Int. Cl.
*G06F 21/10* (2013.01)
*G06K 7/14* (2006.01)
*G06K 7/10* (2006.01)

(52) U.S. Cl.
CPC ....... *G06F 21/105* (2013.01); *G06K 7/10722* (2013.01); *G06K 7/1417* (2013.01); *G06F 2221/0759* (2013.01); *G06K 2007/10524* (2013.01)

(58) Field of Classification Search
CPC ...... G06F 21/10; G06F 21/105; G06K 7/1417
USPC .......................................................... 726/26
See application file for complete search history.

(56) References Cited

U.S. PATENT DOCUMENTS 10,154,020 B1\* 12/2018 Bolotin .............. G06Q 30/0214
2018/0114197 A1\* 4/2018 Morris ................. G06Q 30/018

\* cited by examiner

*Primary Examiner* — Toan C Ly
(74) *Attorney, Agent, or Firm* — ArentFox Schiff

(57) ABSTRACT

Example implementations include a method, apparatus and computer-readable medium of configuring a license for a component configurable with a computer system, comprising storing the component on the computer system. The implementations further include encoding computer system information corresponding to the computer system into a barcode, such as a Quick Response (QR) code. Additionally, the implementations further include displaying the barcode and a license identifier field. Additionally, the implementations further include receiving a license identifier in the license identifier field, wherein the license identifier is based on the barcode. Additionally, the implementations further include decoding the license for the component based on the license identifier.

27 Claims, 6 Drawing Sheets

BARCODE-BASED LICENSE CONFIGURATION FOR AIR-GAPPED SYSTEMS

TECHNICAL FIELD

The described aspects relate to configuration of computer systems and specifically to a barcode-based license configuration for air-gapped systems.

BACKGROUND

Components of a computer system (e.g., hardware, software, or firmware components) are typically configured/activated by providing license information to the computer system on which a component are installed. The license information may be provided to the computer system from a network-based server via a communication interface on the computer system. However, when the computer system is in an air-gapped environment (i.e., not connected to a communication network), a user installing/activating the component may have to manually retrieve and input system information of the computer system prior to fetching license information for the component. For example, it is a common practice to lock a license file (via encryption or other means) to a specific target system or set of hardware. This may be accomplished by using unique information about the hardware configuration of the computer system, such as serial numbers, media access control (MAC) addresses, and globally unique identifiers (GUIDs). The extraction of this information may be done by networking or some physical media.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of configuring a license for a component configurable with a computer system, comprising storing the component on the computer system. The method further includes encoding computer system information corresponding to the computer system into a barcode. Additionally, the method further includes displaying the barcode and a license identifier field. Additionally, the method further includes receiving a license identifier in the license identifier field, wherein the license identifier is based on the barcode. Additionally, the method further includes decoding the license for the component based on the license identifier.

Another example implementation includes an apparatus for configuring a license for a component configurable with a computer system, comprising of memory and a processor in communication with the memory. The processor is configured to store the component on the computer system. The processor is further configured to encode unique computer system information corresponding to the computer system into a barcode. Additionally, the processor further configured to display the barcode and a license identifier field. Additionally, the processor further configured to receive a license identifier in the license identifier field, wherein the license identifier is based on the barcode. Additionally, the processor further configured to decode the license for the component based on the license identifier. In an optional aspect, the processor may be configured to ensure that the unique computer system information corresponds to that of the license identifier.

Another example implementation includes an apparatus for configuring a license for a component configurable with a computer system, comprising means for storing the component on the computer system. The apparatus further includes means for encoding computer system information corresponding to the computer system into a barcode. Additionally, the apparatus further includes means for displaying the barcode and a license identifier field. Additionally, the apparatus further includes means for receiving a license identifier in the license identifier field, wherein the license identifier is based on the barcode. Additionally, the apparatus further includes means for decoding the license for the component based on the license identifier.

Another example implementation includes a computer-readable medium computer-readable medium comprising stored instructions of configuring a license for a component configurable with a computer system, executable by a processor to store the component on the computer system. The instructions are further executable to encode computer system information corresponding to the computer system into a barcode. Additionally, the instructions are further executable to display the barcode and a license identifier field. Additionally, the instructions are further executable to receive a license identifier in the license identifier field, wherein the license identifier is based on the barcode. Additionally, the instructions are further executable to decode the license for the component based on the license identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The method, apparatus and computer readable medium of the present application may encode unique system information of a computer system as a barcode, including a quick response (QR) code, which may then be read by a portable device having a camera. The barcode, such as the QR code, may be subsequently used to generate or lock a license file to the computer system. It may often be the case that the computer system is being deployed in an environment which is air-gapped, i.e., having no network connection to an outside network. In such situation, an individual(s) deploying a component on the computer system may otherwise need to use some form of media to transport the unique system information to another system which is connected to a network, so that it can be used to generate a license.

By using the barcode and the portable device, the use of additional media and a need to attach that media to a separate networked device may be overcome, resulting in savings of time and effort to the individual(s) deploying the component. The resulting license can then be presented on the portable device based on a license identifier, such as but not limited to a 5×5 identifier, which may be a five block long identifier with each block being five characters long. Further, the license identifier may be a key or a code that represents or defines or embodies the license, or may be a pointer to the license. The license identifier can be entered into the computer system via an input interface.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
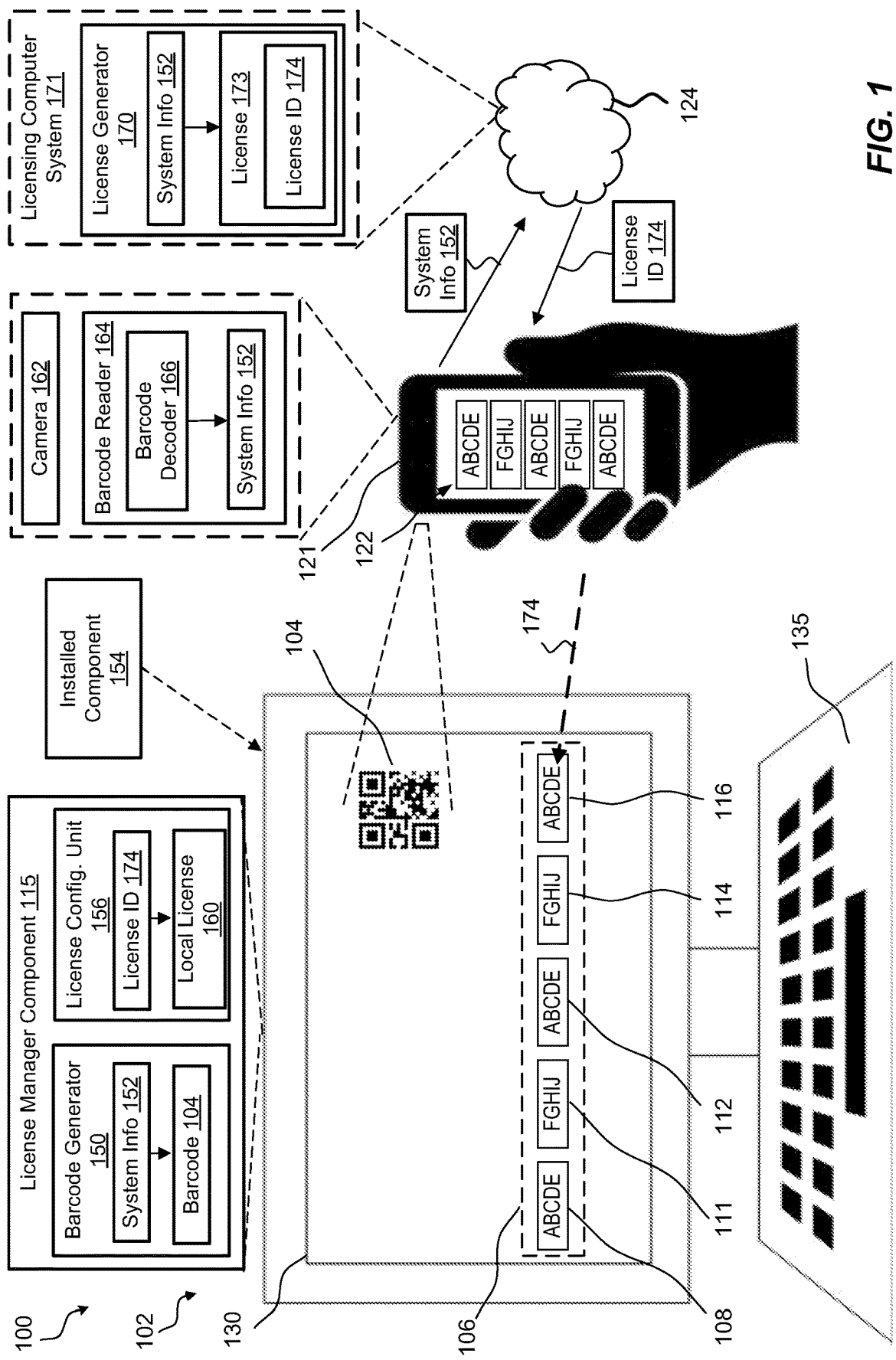
FIG. 1 is a system architecture diagram of a barcode-based license configuration system.

Referring to FIG. 1, a barcode-based license configuration system 100 includes a computer system 102 having a displaying component 130 (e.g., a monitor, a touchscreen, etc.) which may display a barcode 104, such as but not limited to a QR code, having encoded system information about the computer system 102 for use in obtaining a license for an installed component 154 on the computer system 102. The installed component 154 may be a hardware component (e.g., a mouse, a memory drive, a monitor, a camera, or any other type of hardware), a software component (e.g., any type of application), and/or a firmware component (e.g., any type of firmware). The computer system 102 also includes a storing component (such as a memory, not shown in FIG. 1 for the purpose of simplification) for storing computer-readable instructions and/or data, and an license manager component 115 which may include hardware, software, and/or firmware configured to perform the actions described herein for generating a barcode and licensing a component on the computer system 102. For example, license manager component 115 includes a barcode generator 150 for generating the barcode 104 that includes system information 152 of the computer system 102, and a license configuration unit 156 for configuring a license 160 for a component installation. The computer system 102 also includes a receiving component 135 (e.g., a keyboard, a numeric keypad, a touchscreen input, etc.) to receive a license identifier 174 for the component installation. The operation of the license manager component 115 causes the displaying component 130 to display a license identifier field 106. The license identifier field 106 may be a field for receiving a license identifier 174 for the license to operate the installed component 154 on the computer system 102. The license identifier field 106 may have any length, such as a 5×5 license identifier field including blocks 108, 111, 112, 114 and 116. Each of the blocks 108, 111, 112, 114 and 116 may receive five alpha-numeric characters, which may be input by a user, corresponding to the license identifier 174.

To facilitate a license configuration for installing and licensing the installed component 154 (e.g., a hardware/software/firmware) on the computer system 102, the barcode generator 150 may include logic or instructions to generate the barcode 104 from system information 152. For example, the system information may include a MAC address of a network component, a GUID, an identifier of a storage device (e.g., the storing component), an identifier of a motherboard, an identifier for a central processing unit (CPU), etc., of the computer system 102. The barcode generator 150 may utilize one or more unique identifiers associated with the computer system 102 or components therein to generate the barcode 104. In one implementation, the barcode generator 150 may utilize the MAC address and the GUID of the computer system 102, and encode the MAC address and the GUID using a hashing technique (e.g., a simple mod, mid-square, Sha256, string folding, etc.) to generate the barcode 104, such as a QR code. The barcode 104 represents data, such as an alphabetic, numeric, or an alpha-numeric code, in a visual, machine-readable form. For example, the barcode 104 may be a one dimensional barcode, representing data by varying the widths and spacings of parallel lines, or a two dimensional barcode, representing data using rectangles, dots, hexagons and other geometric patterns, such as but not limited to a QR code.

A portable device 121 in the barcode-based license configuration system 100 may read the displayed barcode 104 on the displaying component 130. The portable device 121 may include a camera 162 and a barcode reader 164 to read the barcode 104. For example, the portable device 121 may be a cellphone, a tablet, or any other portable electronic device having the camera 162 to read the QR code. In one implementation, a user holding the portable device 121 may focus the camera 162 on the barcode 104 displayed on the displaying component 130. In another implementation, the portable device 121 may be configured on a supporting device (e.g., a stand) with the camera focused on the region of the displaying component 130 that displays the barcode 104.

One or more components (e.g., a processor, a memory, etc.) of the portable device 121 may transfer the image captured by the camera 162 to the barcode reader 164. The barcode reader 164 may include a barcode decoder 166 to decode the system information included in the barcode 104 as captured by the camera 162. For example, the barcode decoder 166 may use a hash decryption technique (e.g., a decryption technique corresponding to the hashing technique used by the barcode generator 150) to decode the system information included in the barcode 104. The barcode decoder 166 may obtain the system information 152 by decoding the barcode 104. 152

The portable device 121 may send the system information 152 to a licensing computer system 171 (with the computer system 102 not having any configured communication connection to the licensing computer system 171). The portable device 121 may send the system information 152 over an encrypted channel between the portable device 121 and the licensing computer system 171. The portable device 121 and the licensing computer system 171 may utilize an encryption technique such as Advanced Encryption Standard (AES), Rivest-Shamir-Adleman (RSA), Elliptic Curve Cryptography (ECC), etc., for the encrypted channel. On receiving the system information 152, the licensing computer system 171 may generate a license 173 having a license identifier (ID) 174 for the installation of the installed component 154 on the computer system 102 based on the system information 152, which ties the license 173 to the specific computer system 102. The licensing computer system 171 may generate the license ID 174 by performing one or more operations through a processor on the licensing computer system 171, or the licensing computer system 171 may fetch the license ID 174 from a cloud network 124. The licensing computer system 171 may include a license generator 170 to generate the license for the component installation. For example, the license generator 170 may store the system information 152 received (over the encrypted channel) from the portable device 121 corresponding to a unique license identifier (license ID) 174. For example, the license generator 170 may store system information 152 in a memory of the licensing computer system 171 corresponding to the license identifier.

The license generator 170 generates the unique license ID 174 for the component installation. For example, the unique license ID 174 may be code that can unlock one or more functionalities (or complete the installation process) of the installed component 154 on the computer system 102. The licensing computer system 171 may send the unique license ID 174 to the portable device 121 over the encrypted channel. On receiving the license ID 174, the portable device 121 may display the license ID 174 on a display component 122 (e.g., a touchscreen, a liquid crystal display (LCD) display, etc.) of the portable device 121. For example, as shown in FIG. 1, the license ID 174 may be a 5×5 license identifier having a 25 character long alphabetic code. The 25 character long alphabetic code may be split into sets of 5 characters each as shown on the display component 122 of the portable device 121.

The user completing the component installation on the computer system 102 may input the license identifier (the 5×5 license identifier in the present example) in the license identifier field 106 displayed on the displaying component 130 of the computer system 102. The license configuration unit 156 may receive the license identifier 174 input by the user in the license identifier field 106, and generate a local license 160 for the installation of the installed component 154 based on the license ID 174. The local license 160 may be linked to the license 173 at the licensing computer system 171 based on the license ID 174. For instance the license 173 may be a master license, from which one or more local licenses 160 for the computer system 102 may be generated. For example, the license configuration unit 156 may generate the local license 160 using a licensing algorithm or rule (e.g., by executing via a processor of the computer system 102, computer program code stored in the storing component of the computer system 102) to activate/unlock the installed component 154 and complete the installation of the installed component 154. In one implementation, when the license configuration unit 156 is unable to generate the local license 160 based on the license ID 174, the license configuration unit 156 may instruct the displaying component 130 to display an error message that the component installation is unsuccessful. The error message may further indicate whether the license ID 174 is invalid (e.g., due to an error in input by the user), or the license ID 174 has been previously used to configure a component and is not usable again.

In one implementation, the local license 160 may be used to activate/unlock multiple components (e.g., components of same type such as security cameras connected to the computer system 102; or a set of components of different types e.g., a security camera and corresponding video storage device for the security camera). The license configuration unit 156 may determine whether a maximum number of components (for multiple components of the same type), or the unique component (in the set of components of different types) corresponding to the local license 160 have already been installed. If the license configuration unit 156 determines that the maximum number of components (for multiple components of the same type), or the unique component (in the set of components of different types) has been installed, the license configuration unit 156 may instruct the displaying component 130 to display an error message that the component installation is unsuccessful. The error message may further includes details of the error in completing the component installation.

In another implementation, the local license 160 may be used to activate/unlock one or more instances of a component on the computer system that is used by multiple users (e.g., multiple instances of the component with each of the multiple instances having different customization of settings for each of the multiple users). The component may be usable by multiple users concurrently or at different times. The license configuration unit 156 may determine whether a maximum number of instances (instance count) of the component corresponding to the local license 160 have already been installed. If the license configuration unit 156 determines that the maximum number of instances of the component have been installed, the license configuration unit 156 may instruct the displaying component 130 to display an error message that the component installation is unsuccessful. The error message may further includes details of the error in completing the component installation.

Figure 2:
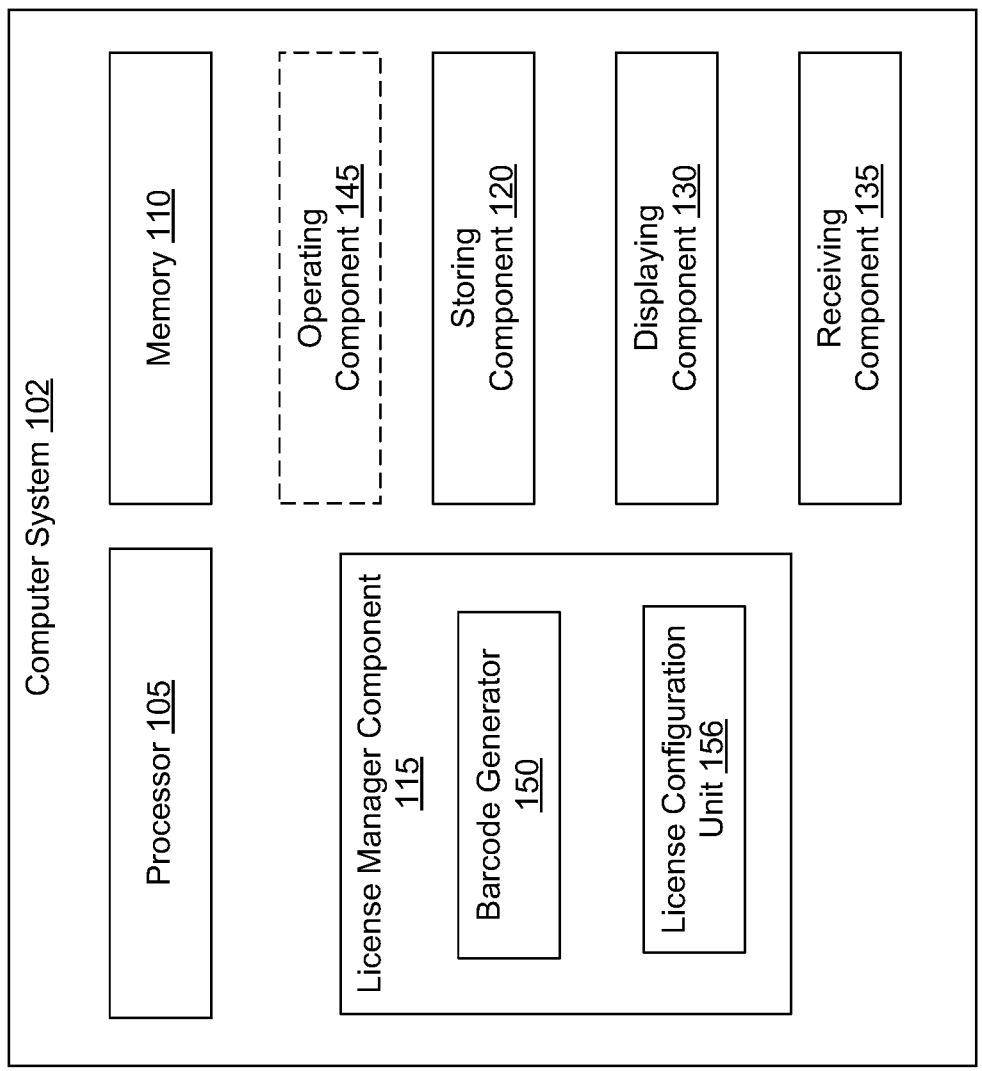
FIG. 2 is a block diagram of a computer system capable of configuring a license for a component based on the barcode-based license configuration system.
Figure 3:
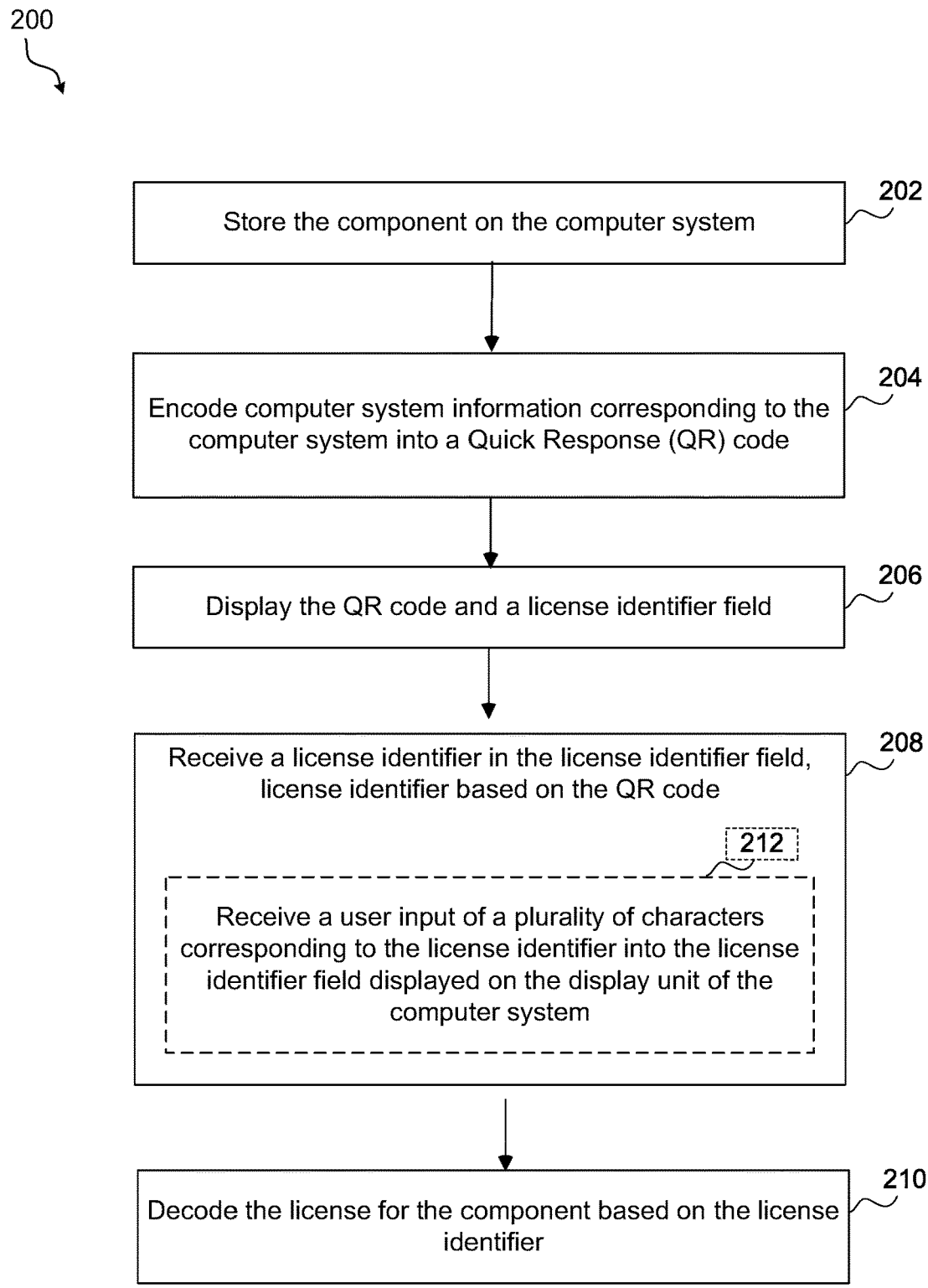
FIG. 3 is a flow diagram of an example method of operation for configuring a license for a component configurable with a computer system.
Figure 4:
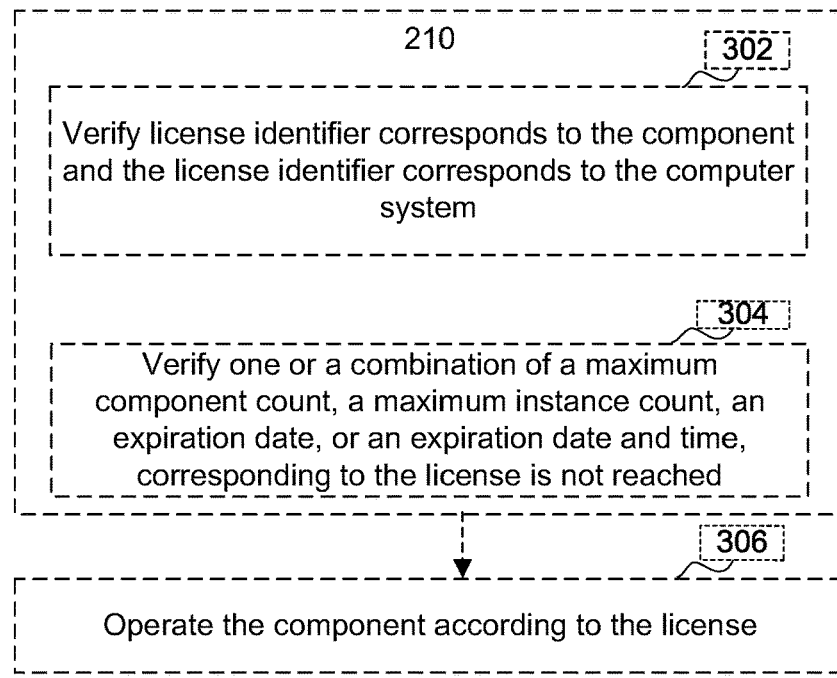
FIG. 4 is a flow diagram of a continuation of the example of the method of operation for configuring the license for the component of FIG. 3, including performing operations based on a license identifier.

Referring to FIGS. 2-4, in operation, the computer system 102 (as described above with reference to FIG. 1) may perform a method 200 for configuring a license for installation of installed component 154 on the computer system 102, such as via execution of the license manager component 115 by a processor 105 and/or a memory 110. The operation of the method 200 in FIGS. 3 and 4 is described in combination with the compute system architecture of FIG. 2 and the overall system architecture of FIG. 1.

At block 202 (see FIG. 3), the method 200 includes storing the component on the computer system. For example, in an aspect, the memory 110 and/or a storing component 120 may be configured to, or may comprise a means for storing the component, e.g., installed component 154, on the computer system 102. In one implementation, the storing component 120 stores information about the installed component 154. For example, the storing component 120 may store a component identifier, a version number, etc. of the installed component 154. The installed component 154 may be one or a combination of a hardware component, a software component, or a firmware component. One or more of the component identifier, the version number, etc. may be utilized by the license configuration unit 156 to configure the license for the installation of the installed component 154 on the computer system 102.

At block 204, the method 200 includes encoding computer system information corresponding to the computer system into a bar code. For example, in an aspect, the computer system 102, the processor 105, the memory 110, the license manager component 115, and/or the barcode generator 150 may be configured to or may comprise means for encoding system information 152 corresponding to the computer system 102 into a barcode 104. In one implementation, the barcode generator 150 may encode (e.g., using an encoding technique such as non return to zero inverted (NRZI), Manchester encoding technique, etc.) one or a combination of a MAC address of a network component, a GUID, an identifier of a storage device (e.g., the storing component), an identifier of a motherboard, an identifier for a central processing unit (CPU) of the computer system 102 into the barcode 104 (e.g., the QR code in FIG. 1). Encoding the system information 152 into the barcode 104 may allow the system information 152 to be represented in a visible, machine-readable pattern, which may be read by the camera 162 and barcode reader 164 of the portable device 121.

At block 206, the method 200 includes displaying the barcode and a license identifier field. For example, in an aspect, the computer system 102, the processor 105, the memory 110, the license manager component 115, and/or the displaying component 130 may be configured to or may comprise means for displaying the barcode and a license identifier field. In one implementation, the processor 105 may receive one or more instructions from the barcode generator 150 may to display the barcode 104 on the displaying component 130. Displaying the barcode 104 on the displaying component 130 may allow the barcode 104 to be read/captured by a camera 162 of the portable device 121.

At block 208, the method 200 includes receiving a license identifier in the license identifier field, wherein the license identifier is based on the barcode. For example, in an aspect, the computer system 102, the processor 105, the memory 110, the license manager component 115, and/or the receiving component 135 may be configured to or may comprise means for receiving the license identifier 174 in the license identifier field 106, where the license identifier 174 is based on the barcode 104. In one implementation, the receiving component 135 may receive the license ID 174 by a user input through the receiving component 135. For example, the user may input the license ID 174 into the license identifier field 106 through a keyboard, mouse, or touchscreen of the computer system 102. The license ID 174 is based on the barcode 104 (as described above in FIG. 1, as the license ID 174 is generated by the license generator 170 based on the system information 152 of the computer system 102. The license ID 174 based on the barcode 104, and in turn based on the system information 152, allows association of the system information 152 to the license ID 174, so that the license ID 174 uniquely corresponds to the computer system 102.

In an optional aspect, at block 212, the receiving at block 208 of the license identifier in the license identifier field further comprises receiving a user input of a plurality of characters corresponding to the license identifier into the license identifier field displayed on the display unit of the computer system 102. For example, the license ID 174 may be a 5×5 license identifier (as described above in FIG. 1). The license ID 174 may be input into the license identifier field 106 on the displaying component 130 of the computer system 102 by a user through the receiving component 135. The license ID 174 having a plurality of characters allows a unique association between the license ID 174 and the system information 152, and such unique association helps in reducing errors during license configuration. Further, one or more characters in the license ID 174 may be specifically designated to identify a type component (e.g., a unique character may represent a hardware component, another unique character may represent a software component, etc.) to be installed, and may allow the user to determine that the license ID 174 being input into the computer system 102 is for the correct component.

At block 210, the method 200 includes decoding the license for the component based on the license identifier. For example, in an aspect, computer system 102, processor 105, memory 110, license manager component 115, and/or the license configuration unit 156 may be configured to or may comprise means for decoding the local license 160 for the installed component 154 based on the license identifier 174. For example, the decoding at block 210 may include generating the local license 160 based on the received license identifier 174 using a licensing algorithm or rule to unlock/activate the installed component 154. In one implementation, the license identifier 174 may act as a key or a code and the license configuration unit 156 may access or decode the license identifier 174 to generate the local license 160 (for example, using licensing algorithm or rule by executing via a processor of the computer system 102, computer program code stored in the storing component 120 of the computer system 102) to activate/unlock the installed component 154 and complete the component installation. The license configuration unit 156 may read the license identifier 174 (for example, by executing via a processor of the computer system 102, computer program code stored in the storing component 120 of the computer system 102) to verify that the component is operated according to the terms/conditions/rules of the license. The configuration of the local license 160 for the installed component 154 by the license configuration unit 156 based on the license ID 174 allows authentication of the installed component 154, and may allow prevention of piracy or manufacture/installation of counterfeit components.

In an optional aspect, referring to FIG. 4, at block 302, the configuring at block 210 of the license for the component further comprises verifying that the license identifier corresponds to the component and the license identifier corresponds to the computer system 102. For example, the license configuration unit 156, before generating the license 160 for activating/unlocking the installed component 154, may verify that the license ID 174 corresponds to the installed component 154 and that the license ID 174 corresponds to the computer system 102. In one implementation, the license configuration unit 156 may determine that one or more characters in the received license identifier 174 corresponds to the type of component (e.g., 'H' being the first character in license ID 174 for a hardware component, etc.). The verification allows for an integrity check before activating/unlocking the component being installed, and also provides for confirmation measures to ensure that the license ID 174 was retrieved from an authentic source. Further, verification of the license ID 174 against information corresponding to the computer system 102 ensures that the license ID 174 was generated for the specific computer system 102.

In another optional aspect, at block 304, the configuring at block 210 of the license for the component further comprises verifying that a maximum component count a maximum instance count, an expiration date, or an expiration date and time, corresponding to the license is not reached. For example, the license configuration unit 156 may determine that a maximum component count and/or a maximum instance count and/or an expiration date and/or an expiration time corresponding to the local license 160 has not been reached. In one implementation, the license configuration unit 156 may check the local license 160 to determine whether a maximum number of components (for multiple components of the same type), or the unique component (in the set of components of different types) has already been installed. The license configuration unit 156 may further check the local license 160 to determine whether the maximum number of instances for the component (for multiple users) have already been installed. The license configuration unit 156 may further check the local license 160 to determine whether the expiration date and/or the expiration time for the local license 160 has passed. If the license configuration unit 156 determines that the maximum number of components (for multiple components of the same type), or the unique component (in the set of components of different types) corresponding to the local license 160 have been installed, or the license configuration unit 156 determines that the maximum number of instances of the component corresponding to the local license 160 have been installed, or the expiration date and/or the expiration time corresponding to the local license 160 have passed, the license configuration unit 156 may instruct the processor 105 and/or the displaying component 130 to display an error message that the component installation is unsuccessful. The error message may further includes details of the error in completing the component installation. Such verification allows that the local license 160 is only used to activate/unlock a specific number of components.

In another optional aspect, at block 306, the method 200 may further include operating the component according to the license. For example, in an aspect, the computer system 102, the processor 105, the memory 110, license manager component 115, and/or an operating component 145 may be configured to or may comprise means for operating the installed component 154 according to the local license 160. In one implementation, the license configuration unit operating component 145 may perform a license validity check every time the installed component 154 is started or the computer system 102 is restarted. The operating component 145 may verify (based on the local license 160) for the installed component 154 that the component is operated according to the local license 160. For example, the local license 160 may specify a maximum number of times the installed component 154 may be operated using the local license 160, or the local license 160 may specify an expiration date (or an expiration date and time) up to which the component may be operated using the local license 160. The operating component 145 may deactivate/lock the component when the maximum number of times or the expiration date (or the expiration date and time) as specified by the local license 160 is reached. Operation of the component according to the local license 160 allows for preventing unauthorized use of the local license 160.

Figure 5:
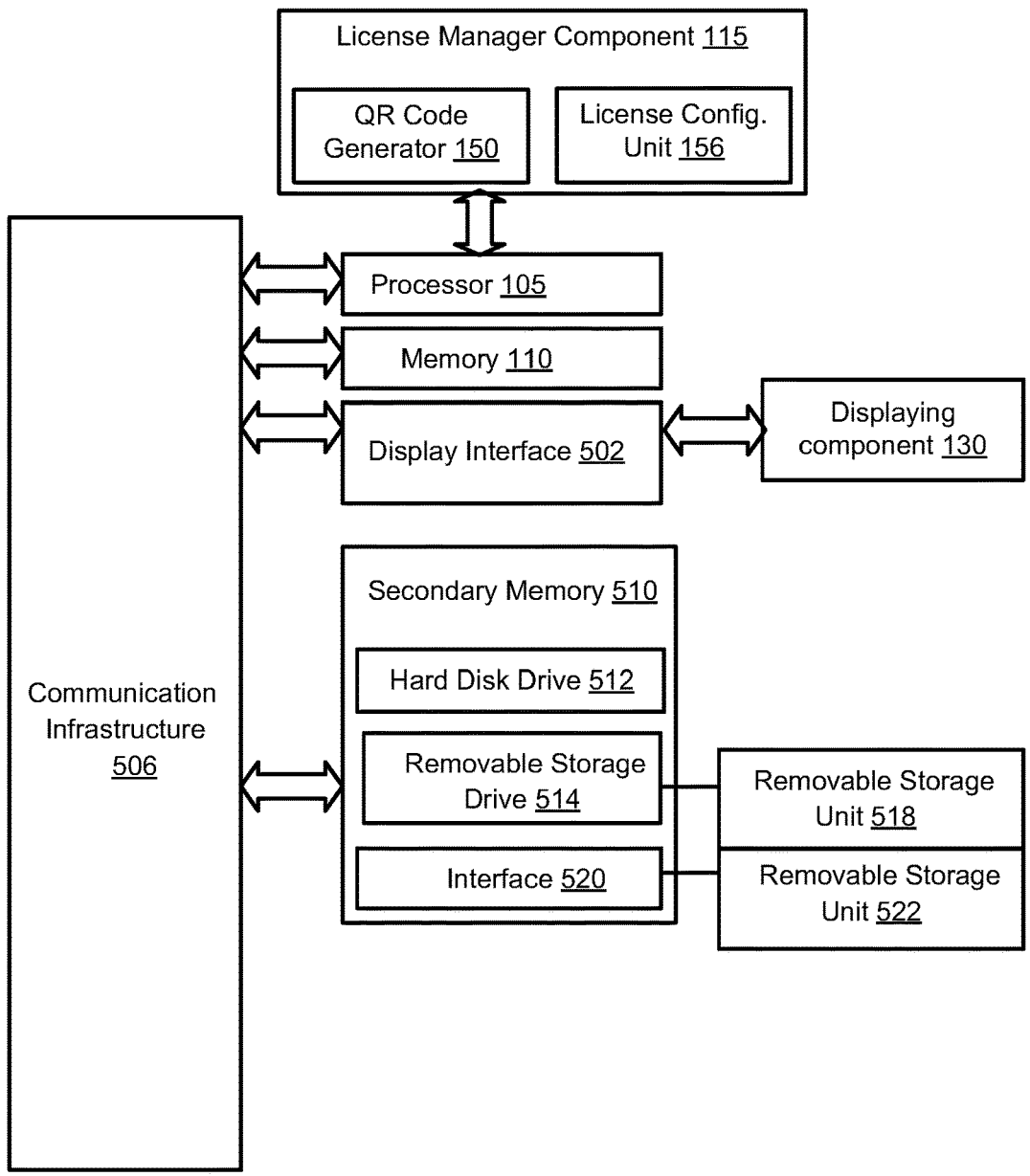
FIG. 5 is a system diagram of an example computer device operable to configure a license for a component based on the barcode-based license configuration system.

Referring to FIG. 5, a more detailed example of the computer system 102 includes a number of components configured to perform the functions described herein. As previously mentioned, computer system 102 includes one or more processors, such as processor 105, and one or more memories, such as memory 110, configured to execute license manager component 115. The processor 105 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The computer system 102 may include a display interface 502 that forwards graphics, text, and other data from the communication infrastructure 506 (or from a frame buffer not shown) for display on the displaying component 130. The computer system 102 also includes memory 110, which may be a main memory, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data.

The computer system 102 also includes the license manager component 115 including the barcode generator 150 and the license configuration unit 156 interfaced to the processor 105 of the computer system 102. The processor 105 of the computer system 102 may be coupled to the license manager component 115 and the displaying component 130 to perform one or more operations by processing the instructions stored in the respective units to perform the operations of the respective units as described in FIGS. 1-4.

Alternative aspects of the present disclosure may include secondary memory 510 and may include other similar devices for allowing computer programs or other instructions to be loaded into computer system 102. Such devices may include, for example, a removable storage unit 522 and an interface 520. Examples of such may include a program cartridge and cartridge interface (such as that found in video game devices), a compact disc (CD) or a digital versatile disc (DVD) and a CD/DVD reader, a universal serial bus (USB) storage and a USB interface, a secure digital (SD) card and an SD card reader, a solid-state disk (SSD) and an SSD (drive), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 102.

In this document, the terms "computer program medium" and "computer usable medium" are used to refer generally to computer-readable media stored on a non-transitory memory device, which may include devices such as a removable storage unit 518 and a hard disk installed in hard disk drive 512. These computer program products provide software to the computer system 102. Aspects of the present disclosure are directed to such computer program products. Computer programs (also referred to as computer control logic) are stored in memory 110 and/or secondary memory 510. Such computer programs, when executed, enable the computer system 102 to perform the features in accordance with aspects of the present disclosure, as discussed herein. In particular, the computer programs, when executed, enable the processor 105 to perform the features in accordance with aspects of the present disclosure. Accordingly, such computer programs represent controllers of the computer system 102.

In an aspect of the present disclosure where the disclosure is implemented using software, the software may be stored in a computer program product and loaded into computer system 102 using removable storage drive 514, hard drive 512, or communications interface 520. The control logic (software), when executed by the processor 105, causes the processor 105 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 6:
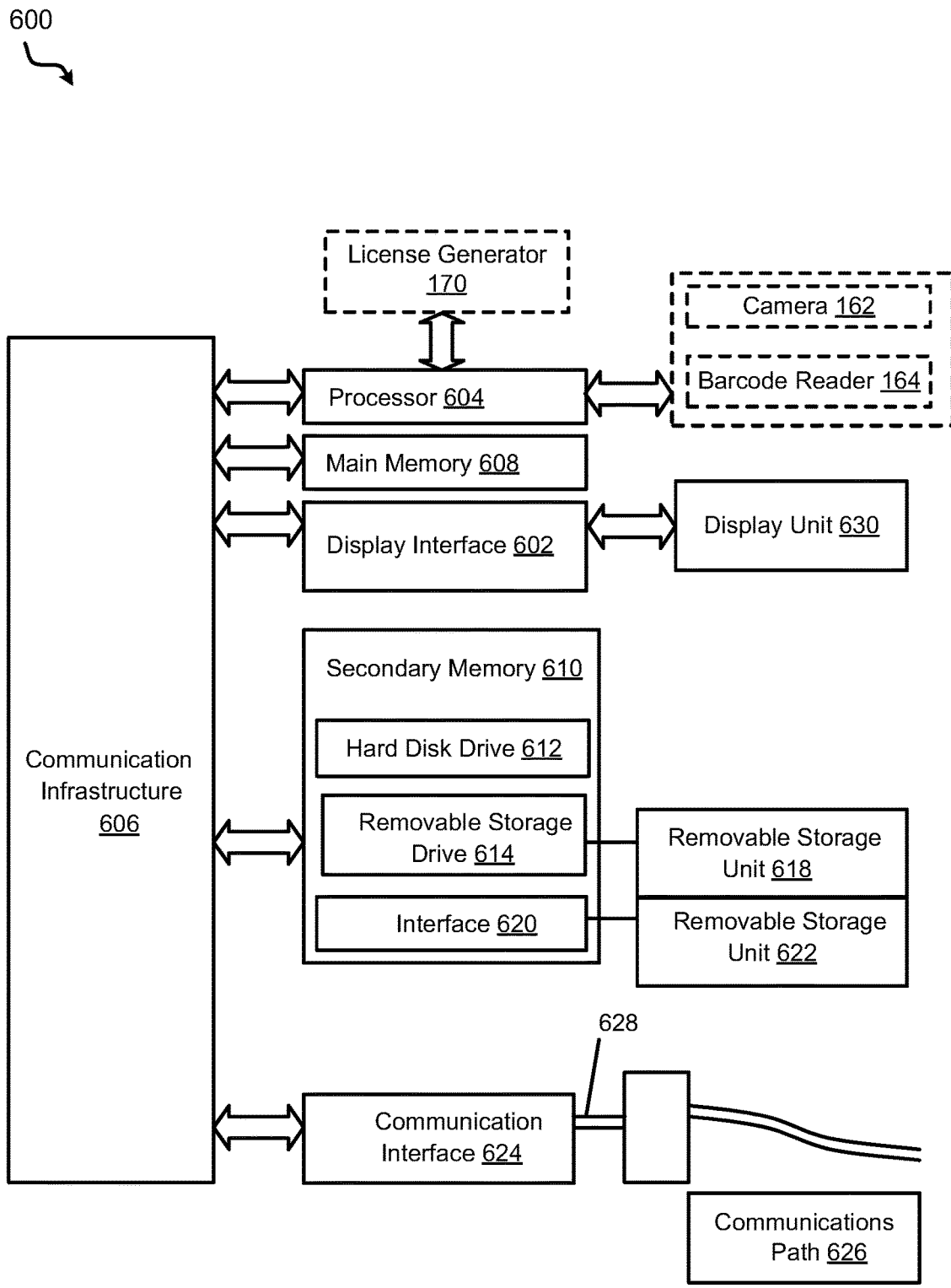
FIG. 6 is a system diagram of an example computer device operable to generate a license for configuring a component based on the barcode-based license configuration system.

Referring to FIG. 6, an example computer device 600 includes a processor 604 that be configured to perform the functions of the portable device 121 or the licensing computer system 171. For example, when configured as the portable device 121, the computer device 600 may be configured with the camera 162 and barcode reader 164 to read and decode the displayed barcode 104 to obtain system information 152, send the system information 152 to the licensing computer system 171, receive the license ID 174 in response, and display the license ID 174 on the display component 122. Further, for example, when configured as the licensing computer system 171, the computer device 600 may be configured with the license generator 170 to generate the license 173 having the license ID 174, based on the received system information 152, and used for configuring the installed component 154 on the computer system 102. The example computer device 600 include a set of components configured in accordance with the present disclosure. Computer device 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer device 600 may include a display interface 602 that forwards graphics, text, and other data from the communication infrastructure 606 (or from a frame buffer not shown) for display on a display unit 630, which in some cases include display component 122 of portable device 121. Computer device 600 also includes a main memory 608, preferably random access memory (RAM), and may also include a secondary memory 610. The secondary memory 610 may include, for example, a hard disk drive 612, and/or a removable storage drive 614, representing a floppy disk drive, a magnetic tape drive, an optical disk drive, a USB flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data.

Alternative aspects of the present disclosure may include secondary memory 610 and may include other similar devices for allowing computer programs or other instructions to be loaded into computer device 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer device 600.

Computer device 600 may also include a communications interface 624. Communications interface 624 allows software and data to be transferred between computer device 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels.

Computer programs (also referred to as computer control logic) are stored in main memory 608 and/or secondary memory 610. Computer programs may also be received via communications interface 624. Such computer programs, when executed, enable the computer device 600 to perform the features in accordance with aspects of the present disclosure, as discussed herein with respect to the portable device 121 and/or the licensing computer system 171. In particular, the computer programs, when executed, enable the processor 604 to perform the features in accordance with aspects of the present disclosure relating to the portable device 121 and/or the licensing computer system 171. Accordingly, such computer programs represent controllers of the computer device 600.

In an aspect of the present disclosure where the disclosure is implemented using software, the software may be stored in a computer program product and loaded into computer device 600 using removable storage drive 614, hard drive 612, or communications interface 620. The control logic (software), when executed by the processor 604, causes the processor 604 to perform the functions described herein relating to the portable device 121 and/or the licensing computer system 171. In another aspect of the present disclosure, the system is implemented primarily in hardware using, for example, hardware components, such as application specific integrated circuits (ASICs), configured to perform the functions described herein relating to the portable device 121 and/or the licensing computer system 171.

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

The various embodiments or components described above, for example, the alarm panel, the central monitoring station, the computer system, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of configuring a license for a component configurable with a computer system, comprising:
   storing, at a memory of the computer system, the component on the computer system;
   encoding, at a processor of the computer system, computer system information corresponding to the computer system into a barcode;
   displaying, at a display unit of the computer system, the barcode and a license identifier field;
   receiving, at the processor of the computer system, a license identifier in the license identifier field, wherein the license identifier is based on the barcode; and
   decoding, at the processor of the computer system, the license for the component based on the license identifier.

2. The method of claim 1, wherein the computer system lacks a configured communication connection to a licensing computer system.

3. The method of claim 1, wherein receiving the license identifier is based on a licensing computer system having received the computer system information encoded in the barcode in response to the barcode having been read by a portable device, and based on the licensing computer system generating the license identifier based at least on the computer system information.

4. The method of claim 1, wherein receiving the license identifier in the license identifier field further comprises receiving a user input of a plurality of characters corresponding to the license identifier into the license identifier field displayed on the display unit of the computer system.

5. The method of claim 4, wherein receiving the license identifier is based on the plurality of characters having been received on a portable device that read the barcode and transmitted the computer system information to a licensing computer system.

6. The method of claim 1, wherein decoding the license for the component further comprises verifying that the license identifier corresponds to the component and the license identifier corresponds to the computer system.

7. The method of claim 1, wherein decoding the license for the component further comprises verifying that one or a combination of a maximum component count, a maximum instance count, an expiration date, an expiration time corresponding to the license is not reached.

8. The method of claim 1, further comprising:
   operating the component according to the license.

9. The method of claim 1, wherein the component is one or a combination of:
   a hardware component;
   a software component; or
   a firmware component.

10. The method of claim 1, wherein the computer system is not connected to a communication network.

11. The method of claim 1, wherein the computer system information comprises one or any combination of:
   a media access control (MAC) address of a network component of the computer system;
   an identifier of a storage device of the computer system;
   an identifier of a motherboard of the computer system;
   an identifier for a central processing unit (CPU) of the computer system; or
   a unique identifier of the component of the computer system.

12. The method of claim 1, wherein the license identifier is a 5×5 identifier, wherein the 5×5 identifier is a five block long identifier, wherein each block of the 5×5 identifier is five characters long.

13. The method of claim 1, wherein the barcode comprises a Quick Response (QR) code.

14. An apparatus for configuring a license for a component configurable with a computer system, comprising:
   a memory;
   a display unit; and
   a processor in communication with the memory and configured to:
      store the component on the computer system;
      encode computer system information corresponding to the computer system into a barcode;
      display the barcode and a license identifier field;
      receive a license identifier in the license identifier field, wherein the license identifier is based on the barcode; and
      decode the license for the component based on the license identifier.

15. The apparatus of claim 14, wherein the computer system lacks a configured communication connection to a licensing computer system.

16. The apparatus of claim 14, wherein to receive the license identifier is based on a licensing computer system having received the computer system information encoded in the barcode in response to the barcode having been read by a portable device, and based on the licensing computer system generating the license identifier based at least on the computer system information.

17. The apparatus of claim 14, wherein to receive the license identifier in the license identifier field the processor is further configured to receive a user input of a plurality of characters corresponding to the license identifier into the license identifier field displayed on the display unit of the computer system.

18. The apparatus of claim 17, wherein to receive the license identifier is based on the plurality of characters having been received on a portable device that read the barcode and transmitted the computer system information to a licensing computer system.

19. The apparatus of claim 14, wherein to decode the license for the component the processor is further configured to verify that the license identifier corresponds to the component and the license identifier corresponds to the computer system.

20. The apparatus of claim 14, wherein to decode the license for the component the processor is further configured to verify that one or a combination of a maximum component count, a maximum instance count, an expiration date, an expiration time corresponding to the license is not reached.

21. The apparatus of claim 14, wherein the processor is further configured to:
operate the component according to the license.

22. The apparatus of claim 14, wherein the component is one or a combination of:
a hardware component;
a software component; or
a firmware component.

23. The apparatus of claim 14, wherein the computer system is not connected to a communication network.

24. The apparatus of claim 14, wherein the computer system information comprises one or any combination of:
a media access control (MAC) address of a network component of the computer system;
an identifier of a storage device of the computer system;
an identifier of a motherboard of the computer system;
an identifier for a central processing unit (CPU) of the computer system; or
a unique identifier of the component of the computer system.

25. The apparatus of claim 14, wherein the license identifier is a 5×5 identifier, wherein the 5×5 identifier is a five block long identifier, wherein each block of the 5×5 identifier is five characters long.

26. The apparatus of claim 14, wherein the barcode comprises a Quick Response (QR) code.

27. A computer-readable medium storing instructions for configuring a license for a component configurable with a computer system, executable by a processor to:
store the component on the computer system;
encode computer system information corresponding to the computer system into a barcode;
display the barcode and a license identifier field;
receive a license identifier in the license identifier field, wherein the license identifier is based on the barcode; and
decode the license for the component based on the license identifier.

* * * * *